United States Patent
Hill et al.

(10) Patent No.: US 10,825,050 B2
(45) Date of Patent: *Nov. 3, 2020

(54) METHODS, SYSTEMS, AND MEDIA FOR IDENTIFYING AUTOMATICALLY REFRESHED ADVERTISEMENTS

(71) Applicant: Integral Ad Science, Inc., New York, NY (US)

(72) Inventors: Daniel Nicholas Hill, Brooklyn, NY (US); Kiril Tsemekhman, San Francisco, CA (US)

(73) Assignee: Integral Ad Science, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/424,544

(22) Filed: May 29, 2019

(65) Prior Publication Data
US 2019/0279252 A1 Sep. 12, 2019

Related U.S. Application Data

(63) Continuation of application No. 14/329,514, filed on Jul. 11, 2014, now Pat. No. 10,311,481.
(Continued)

(51) Int. Cl.
*G06Q 30/02* (2012.01)
(52) U.S. Cl.
CPC ..... *G06Q 30/0264* (2013.01); *G06Q 30/0249* (2013.01); *G06Q 30/0263* (2013.01); *G06Q 30/0277* (2013.01)

(58) Field of Classification Search
None
See application file for complete search history.

(56) References Cited

U.S. PATENT DOCUMENTS

| 8,069,267 B2 * | 11/2011 | Powers-Boyle ... G06Q 30/0272 705/14.68 |
| 2008/0126159 A1 * | 5/2008 | Wee ........................ G06Q 30/00 705/7.33 |

(Continued)

OTHER PUBLICATIONS

Alexx Cass, "The Real Impact of Auto-Refresh Page Inflation," available on Jan. 19, 2010, retrieved from http://digitalministry.com/AU/articles/993/The+Real+Impact+of+Auto+Refresh+Page+Inflation/1 (Year: 2010).*

(Continued)

*Primary Examiner* — Sam Refai
(74) *Attorney, Agent, or Firm* — Byrne Poh LLP

(57) ABSTRACT

Methods, systems, and media for identifying automatically refreshed advertisements are provided. In some embodiments, a method for modifying advertisement spending is provided, the method comprising: receiving advertisement delivery information associated with a plurality of advertisements displayed on a web page; generating a distribution of an amount of time that the plurality of advertisements were displayed on the web page using the advertisement delivery information; identifying a deviation in the generated distribution; determining whether the deviation correlates to an automatic refresh command performed by one or more browser applications; and providing an indication corresponding to the plurality of advertisements that were displayed on the web page in response to the automatic refresh command based on the determination.

21 Claims, 5 Drawing Sheets

Related U.S. Application Data

(60) Provisional application No. 61/845,200, filed on Jul. 11, 2013.

(56) References Cited

U.S. PATENT DOCUMENTS

| | | | | |
|---|---|---|---|---|
| 2010/0268584 A1* | 10/2010 | Pullur | ................ | G06Q 30/0241 |
| | | | | 705/14.16 |
| 2012/0208624 A1* | 8/2012 | Ganz | ....................... | A63F 13/61 |
| | | | | 463/25 |
| 2015/0025980 A1* | 1/2015 | Zaretsky | ............ | G06Q 30/0275 |
| | | | | 705/14.71 |

OTHER PUBLICATIONS

Benjamin Edelman, "The Dark Underbelly of Online Advertising," available on Nov. 17, 2009, retrieved from https://hbr.org/2009/11/dark-underbelly-of-online-ads.html (Year: 2009).*

Ed Kohler, "Newspaper Auto-Refresh Pages and Hurt Advertisers", available on Mar. 13, 2009, retrieved from http://www.thedeets.com/2009/03/12/newspapers-auto-refresh-pages-and-hurt-advertisers/.

Alexx Cass, "The Real Impact of Auto-Refresh Page Inflation", available on Jan. 19, 2010, retrieved from http://digitalministry.com/AU/articles/993/The+Real+Impact+of+Auto-Refresh+Page+Inflation/1.

Notice of Allowance dated Jan. 23, 2019 in U.S. Appl. No. 14/329,514.
Office Action dated Jan. 11, 2016 in U.S. Appl. No. 14/329,514.
Office Action dated May 1, 2017 in U.S. Appl. No. 14/329,514.
Office Action dated Sep. 29, 2016 in U.S. Appl. No. 14/329,514.
Office Action dated Nov. 15, 2017 in U.S. Appl. No. 14/329,514.

* cited by examiner

METHODS, SYSTEMS, AND MEDIA FOR IDENTIFYING AUTOMATICALLY REFRESHED ADVERTISEMENTS

CROSS-REFERENCE TO RELATED APPLICATIONS

This application is a continuation of U.S. patent application Ser. No. 14/329,514, filed Jul. 11, 2014, which claims the benefit of U.S. Provisional Patent Application No. 61/845,200, filed Jul. 11, 2013, each of which is hereby incorporated by reference herein in its entirety.

BACKGROUND

Web pages or individual elements on these pages are automatically refreshed or reloaded by a browser application after a given period of time. For example, a web page can contain an attribute that calls for automatically refreshing the page and another attribute that sets the amount of time that elapses until the refresh command occurs, such as ten seconds. This can be done, for example, to refresh time-sensitive content, such as the headlines or breaking news on a news website, updated bidding information on an auction website, or the start of ticket sales on an online marketplace. This can also be done to serve multiple advertisements to a user using a browser application during the visitation of a particular web page.

The automatic refreshing or reloading of advertisements, however, can be problematic for brand managers, ad networks, publishers, advertisers, and/or advertising agencies (collectively referred to herein as "advertisers"). For example, an auto-refreshed advertisement, while placed in a viewable area on a browser application, may correspond to an absent user. As a result, with the absent user, the browser application can continue to auto-refresh, thereby loading additional paid impressions that are never actually viewed by the user. In another example, a web page can have a very short refresh time (e.g., less than thirty seconds) that does not provide the user of the browser application with sufficient time to be engaged by the displayed advertisement. While these advertisements may be viewed by the user, such advertisements tend to be less effective. In yet another example, it is not ideal for the user to view and/or be engaged with an advertisement associated with a particular company only to be replaced, due to an auto-refresh command, with another advertisement associated with another company, such as a competing company.

Not only can the auto-refresh command be a waste of advertising budget as described in the above-mentioned scenarios, but it can be a wasted opportunity to use that advertising budget to target other users. Accordingly, it would be desirable to identify web pages that auto-refresh their advertisement impressions. It is difficult, however, to separate an auto-refresh command of a webpage from user behavior (e.g., selecting a reload button). For example, the auto-refreshing of a webpage does not generate an identifying signal that the advertisement can transmit back to the advertiser. In addition, the source code corresponding to the webpage can generally not be inspected as the source code may be obfuscated, whether intentionally or otherwise, to hide such commands.

Accordingly, it is desirable to provide methods, systems, and media for identifying automatically refreshed advertisements. More particularly, it is desirable to provide an advertiser with information relating to auto-refreshed advertisements, such as an indication of advertisement budget spent on auto-refreshed advertisement information.

SUMMARY

In accordance with some embodiments of the disclosed subject matter, mechanisms, which can include methods, systems, and/or media, for identifying automatically refreshed advertisements are provided.

In accordance with some embodiments of the disclosed subject matter, a method for modifying advertisement spending is provided, the method comprising: receiving, using a hardware processor, advertisement delivery information associated with a plurality of advertisements displayed on a web page; generating a distribution of an amount of time that the plurality of advertisements were displayed on the web page using the advertisement delivery information; identifying a deviation in the generated distribution; determining whether the deviation correlates to an automatic refresh command performed by one or more browser applications; and providing an indication corresponding to the plurality of advertisements that were displayed on the web page in response to the automatic refresh command based on the determination.

In some embodiments, the advertisement delivery information includes an advertisement load time and an advertisement unload time.

In some embodiments, generating the distribution further includes: calculating advertisement display data based on the advertisement delivery information; and fitting a Weibull distribution to advertisement display data associated with the web page.

In some embodiments, pattern features are extracted from the generated distribution. In some embodiments, the method can include determining whether at least one of the extracted pattern features is a sharp peak in the number of advertisements that were displayed on the web page over a short duration. In some embodiments, this can include determining whether the sharp peak is followed by a significantly smaller number of advertisements that were displayed on the web page over a longer duration.

In some embodiments, the method can include determining that a first portion of the sharp peak corresponds to the automatic refresh command and a second portion of the sharp peak corresponds to user commands to the one or more browser applications.

In some embodiments, the method can include: receiving the web page; and providing an indication of the plurality of advertisements displayed on the web page in response to the automatic refresh command from the one or more browser applications.

In some embodiments, the method can include: receiving a budget for displaying one or more advertisements on the web page; and determining a portion of the budget that is associated with the plurality of advertisements displayed in response to the automatic refresh command.

In some embodiments, the method can include: determining whether a percentage of advertisements were displayed on the web page in response to the automatic refresh command is greater than a threshold value; and inhibiting additional advertisements from being presented on the web page based on the determination.

In accordance with some embodiments of the disclosed subject matter, a system for modifying advertisement spending is provided, the system comprising: a hardware processor that is configured to: receive advertisement delivery information associated with a plurality of advertisements displayed on a web page; generate a distribution of an amount of time that the plurality of advertisements were displayed on the web page using the advertisement delivery information; identify a deviation in the generated distribution; determine whether the deviation correlates to an automatic refresh command performed by one or more browser applications; and provide an indication corresponding to the plurality of advertisements that were displayed on the web page in response to the automatic refresh command based on the determination.

In accordance with some embodiments of the disclosed subject matter, a non-transitory computer-readable medium containing computer-executable instructions that, when executed by a processor, cause the processor to perform a method for modifying advertisement spending is provided, the method comprising: receiving advertisement delivery information associated with a plurality of advertisements displayed on a web page; generating a distribution of an amount of time that the plurality of advertisements were displayed on the web page using the advertisement delivery information; identifying a deviation in the generated distribution; determining whether the deviation correlates to an automatic refresh command performed by one or more browser applications; and providing an indication corresponding to the plurality of advertisements that were displayed on the web page in response to the automatic refresh command based on the determination.

In accordance with some embodiments of the disclosed subject matter, a system for modifying advertisement spending is provided, the system comprising: means for receiving advertisement delivery information associated with a plurality of advertisements displayed on a web page; means for generating a distribution of an amount of time that the plurality of advertisements were displayed on the web page using the advertisement delivery information; means for identifying a deviation in the generated distribution; determine whether the deviation correlates to an automatic refresh command performed by one or more browser applications; and means for providing an indication corresponding to the plurality of advertisements that were displayed on the web page in response to the automatic refresh command based on the determination.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiments of the disclosed subject matter, mechanisms for identifying automatically refreshed advertisements are provided.

Generally speaking, the mechanisms relate to identifying display advertisements that have been automatically refreshed (sometimes referred to herein as an "auto-refreshed advertisement"). More particularly, these mechanisms can include collecting advertisement impression information associated with a particular web page and detecting patterns within the advertisement impression information to identify whether the web page automatically refreshed the advertisements displayed on the web page.

These mechanisms can be used in a variety of applications. For example, these mechanisms can be used to provide advertisers with an indication of how much of their advertisement spending or advertising budget for a particular web page was used on advertisement impressions that were automatically refreshed. In another example, these mechanisms can be used to provide advertisers with an identification of which web pages significantly include advertisement impressions that were automatically refreshed. In yet another example, these mechanisms can be used to provide advertisers with an approach for inhibiting advertising budget from being used on one or more web pages that significantly include advertisements impressions that were automatically refreshed (e.g., a percentage greater than a particular threshold value).

Figure 1:
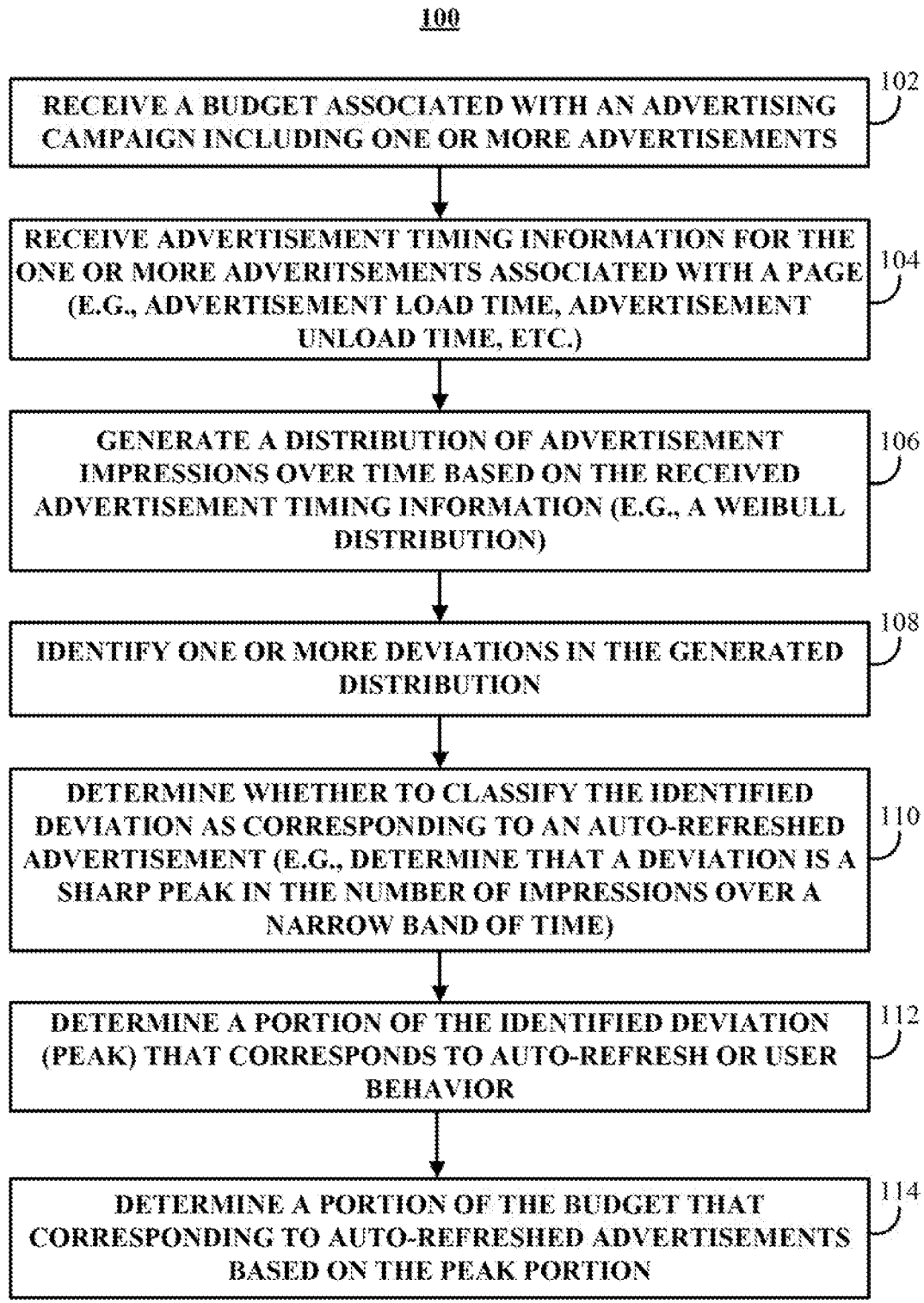
FIG. 1 shows an illustrative process for identifying auto-refreshed advertisements in accordance with some embodiments of the disclosed subject matter.

Turning to FIG. 1, an example 100 of a process for identifying auto-refreshed advertisements in accordance with some embodiments of the disclosed subject matter is shown. At 102, process 100 can begin by receiving an advertising budget for displaying one or more advertisements on a particular web page. For example, an advertisement management system can provide an advertiser with an interface for inputting an advertising budget designated for one or more web pages. In another example, the advertisement management system can provide an advertiser with an interface for inputting a particular web page and providing a proposed advertising budget for spending on that particular web page.

At 104, process 100 can receive advertisement impression information associated with the particular web page, such as advertisement delivery information that can include advertisement loading times, advertisement unloading times, etc. In a more particular embodiment, process 100 can receive advertisement impression information associated with the particular web page based on various properties reported by monitoring code (e.g., in-view time, size, placement, etc.). Advertisement delivery information can be provided to the advertisement management system in any suitable matter. For example, the advertisement management system can receive advertisement delivery information from monitoring code or advertisement tags that control or track advertisement delivery. These advertisement tags can provide information relating to whether an advertisement has been served to a browser application. Such information can include, for example, the type of browser application that loaded the advertisement, the advertisement that was loaded on the web page, web page information, the time that the advertisement was loaded and unloaded on the web page, an indication of whether the browser application was closed, etc. In another example, the advertisement management system can receive advertisement delivery information from the advertiser (e.g., an advertisement server associated with the advertiser).

Alternatively or additionally, the advertisement management system can receive advertisement delivery information that includes recorded durations corresponding to the advertisement on the page. For example, a timer can be started in response to placing an advertisement on a page and the timer can be stopped in response to determining an action by the user of the browser application (e.g., closing the browser window, accessing a different page, etc.). The results of such a timer can be transmitted to the advertisement management system (e.g., via monitoring code loaded on a browser application).

Figure 2:
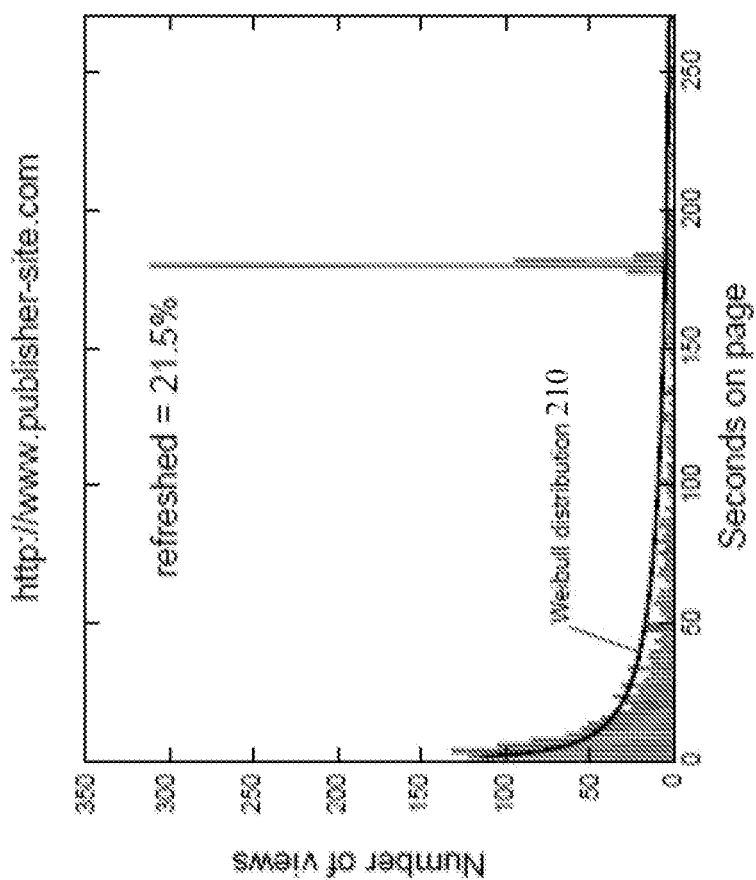
FIG. 2 shows an illustrative Weibull probability distribution that has been fitted to advertisement display information for an advertisement impression on a particular web page or web site in accordance with some embodiments of the disclosed subject matter.

At 106, a distribution of advertisement impressions over time can be generated. For example, the advertisement management system can determine advertisement display information using the advertisement delivery information from the monitoring code. In a more particular example, the advertisement management system can calculate the amount of time that an advertisement impression was displayed on the web page and the number of views of the advertisement impression over time. An example of such a distribution is shown in FIG. 2. As shown, FIG. 2 is an illustrative example of the number of views of an advertisement impression displayed on a browser application that visits the web page www.publisher-site.com over time in seconds.

In a more particular embodiment, the advertisement display information including the number of views of an advertisement impression on a web page over time can be fitted with a Weibull distribution. As shown in FIG. 2, a Weibull distribution 210 is fitted to the advertisement display information calculated from an advertisement impression on a particular web page.

Referring back to FIG. 1, at 108, the advertisement management system can identify whether there are deviations in the generated distribution. More particularly, the advertisement management system can determine whether there are statistically significant deviations from the Weibull distribution. As shown in FIG. 2, a statistically significant deviation can include a sharp increase in the number of views of the advertisement impression over a short duration of time. In another example, the advertisement management system can identify a deviation as an increase in the number of views of an advertisement impression on a particular website that is greater than a particular threshold value (e.g., two hundred views), where the increase occurs over a period of time less than a particular value (e.g., five seconds). In this example, the threshold view value and the particular time value can be selected based on previous advertisement display information and previous distributions. For example, for a particular category or type of web pages, the advertisement management system can determine that a deviation in the distribution for the particular category or type of web pages occurs when there is an increase of one hundred views of an advertisement impression over a five second time period.

In some embodiments, the advertisement management system can identify a deviation based on the above-mentioned pattern (e.g., a sharp increase or peak) and monitor the advertisement display information following the detected deviation. For example, the advertisement management system can determine whether the deviation is followed by an absence of views over a long duration of time. As shown in FIG. 2, because a user of a browser application cannot remain on a particular web page longer than an auto-refresh time, such a deviation can be followed by an absence of views over a particular period of time.

In some embodiments, at 110, the advertisement management system can determine whether to classify the identified deviation as corresponding to an auto-refreshed advertisement or user behavior (e.g., user interaction with the particular web page being displayed in the browser application). As described above, the advertisement management system can classify a deviation as corresponding to an auto-refreshed advertisement based on the increase in the number of impressions and the time period that the increase occurs. A sharp increase in the number of impressions that terminates over a narrow band of time intervals can be an indication of an auto-refreshed advertisement. For example, the advertisement management system can classify a deviation as corresponding to an auto-refreshed advertisement in response to determining that the increase in the number of views of an advertisement impression on a particular website is greater than a particular threshold value (e.g., two hundred views) and occurs over a period of time less than a particular value (e.g., five seconds). Alternatively, the advertisement management system can classify the deviation as relating to user behavior.

Figure 3:
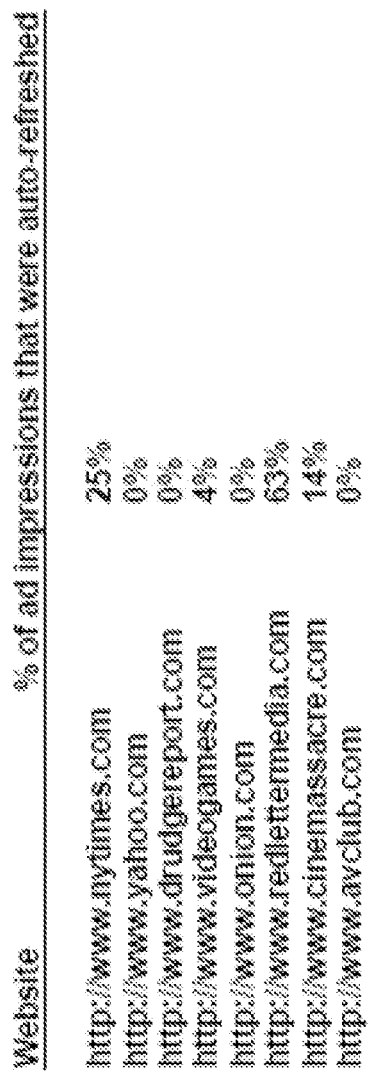
FIG. 3 shows an illustrative indication of auto-refreshed advertisements on one or more web pages or web sites in accordance with some embodiments of the disclosed subject matter.

At 112, the advertisement management system can determine a portion of the deviation (e.g., the sharp increase or peak) in the distribution corresponds to an auto-refreshed advertisement versus alternative sources, such as user behavior. For example, as shown in FIG. 2, the advertisement management system has determined that 21.5% of all of the advertisement impressions corresponds to an auto-refresh command performed by a browser application. As shown in FIG. 3, an indication of advertisement impressions that were auto-refreshed (or auto-refreshed advertisements) can be provided to the advertiser. More particularly, the advertiser can be provided with an opportunity to input one or more web pages of interest and, in response, receive a report indicating the percentage of advertisement impressions that were auto-refreshed on each of the inputted web pages of interest.

Additionally or alternatively, the indication provided to the advertiser can be whether or not the particular web page auto-refreshed advertisements. Any suitable indication relating to auto-refreshed advertisements can be provided to the advertiser.

In some embodiments, in response to receiving the indication of advertisement impressions that were auto-refreshed (or auto-refreshed advertisements), the advertisement management system can aggregate the advertisement impression information associated with the particular web page, the advertisement delivery information, and the indications and determine whether to place additional advertisements on the particular web page based on the indications.

In some embodiments, in response to receiving the indication of advertisement impressions that were auto-refreshed (or auto-refreshed advertisements), the advertisement management system can review the advertising budget information provided by an advertiser associated with one or more web pages and use the indications to allocate the advertising budget among one or more web pages.

In some embodiments, in addition to receiving advertising budget information for display one or more advertisements on a particular web page from the advertiser, the advertisement management system can provide the advertiser with an interface for inputting an auto-refresh threshold value. For example, in response to receiving a threshold value of 50% and in response to receiving the indications shown in FIG. 3, the advertisement management system can inhibit additional advertisements being presented on (and advertisement budget being spent on) on particular web pages, such as www.redlettermedia.com. In another example, in response to reviewing the indications shown in FIG. 3, the advertisement management system can determine that the auto-refresh threshold value should be adjusted based on the indications (e.g., the advertiser should set the auto-refresh threshold value at 14% to optimize advertisement placements). In this example, the advertisement managements system can present the adjusted auto-refresh threshold value to the advertisement in any suitable manner (e.g., a notification, an approval message, etc.).

It should be noted that, additionally or alternatively to the Weibull distribution, any suitable probability distribution can be fitted to the advertisement display information. It should also be noted that, in some embodiments, alternatively to generating a distribution, such as a Weibull distribution, the advertisement management system can generate measurements relating to user behavior on web pages. For example, instead of generating a Weibull distribution, the advertisement management application can generate a predictive model that determines the duration or other timing parameter that users of browser applications spend on a particular web page. The predictive model can, for example, estimate the amount of time that a user of a browser application spends on a particular web page and the advertisement management application can then detect deviations from the generated measurements (e.g., derived from the predictive model). In another example, instead of generating a Weibull distribution, the advertisement management application can determine particular parameters, such as a shape parameter or a scale parameter, and can identify whether there are deviations based on the one or more determined parameters.

Figure 4:
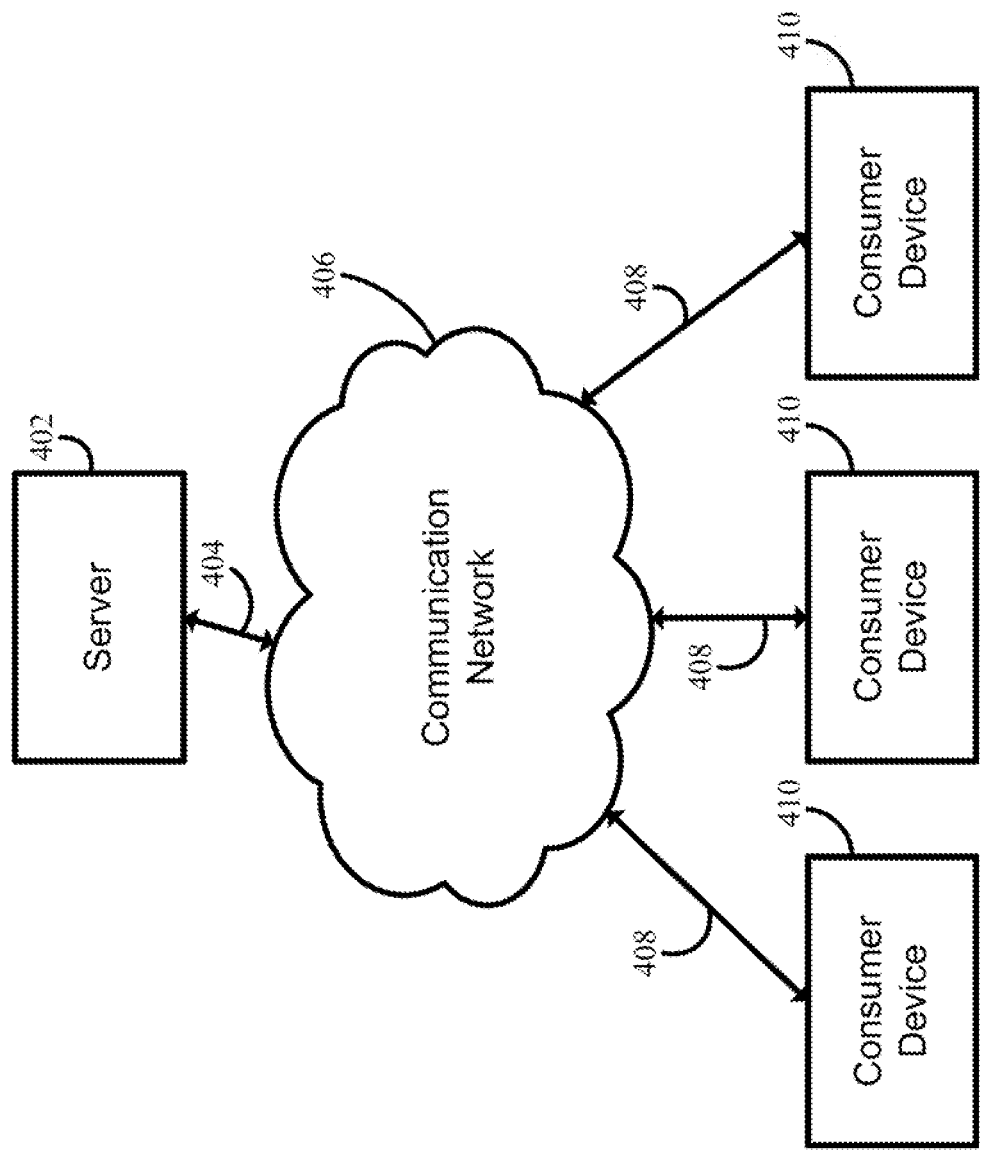
FIG. 4 shows a schematic diagram of an illustrative system suitable for implementation of mechanisms described herein for identifying auto-refreshed advertisements and/or managing the placement of advertisements in accordance with some embodiments of the disclosed subject matter.

FIG. 4 shows an example of a generalized schematic diagram of a system 400 on which the mechanisms for identifying automatically refreshed advertisements described herein can be implemented as an application in accordance with some embodiments. As illustrated, system 400 can include one or more consumer devices 410. Consumer devices 410 can be local to each other or remote from each other. Consumer devices 410 can be connected by one or more communications links 408 to a communications network 406 that can be linked via a communications link 404 to a server 402.

System 400 can include one or more servers 402. Server 402 can be any suitable server for utilizing the mechanisms described herein and/or executing process 100, such as a processor, a computer, a data processing device, or any suitable combination of such devices. For example, the mechanisms described herein can be distributed into multiple backend components and multiple frontend components or interfaces. In a more particular example, backend components, such as data collection and data distribution can be performed on one or more servers 402.

More particularly, for example, each of the consumer devices 410 and server 402 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, consumer device 410 can be implemented as a personal computer, a smartphone, a tablet computer, a personal data assistant (PDA), a multimedia terminal, a mobile telephone, a set-top box, a television, a game console, etc.

In some embodiments, communications network 406 can be any suitable computer network or combination of networks including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), etc. Communications links 404 and 408 can be any communications links suitable for communicating data between consumer devices 410 and server 402, such as network links, dial-up links, wireless links, hard-wired links, any other suitable communications links, or any suitable combination of such links. Consumer devices 410 can enable a user to load a web page that causes features of mechanisms described herein to be accessed. Consumer devices 410 and server 402 can be located at any suitable location.

Figure 5:
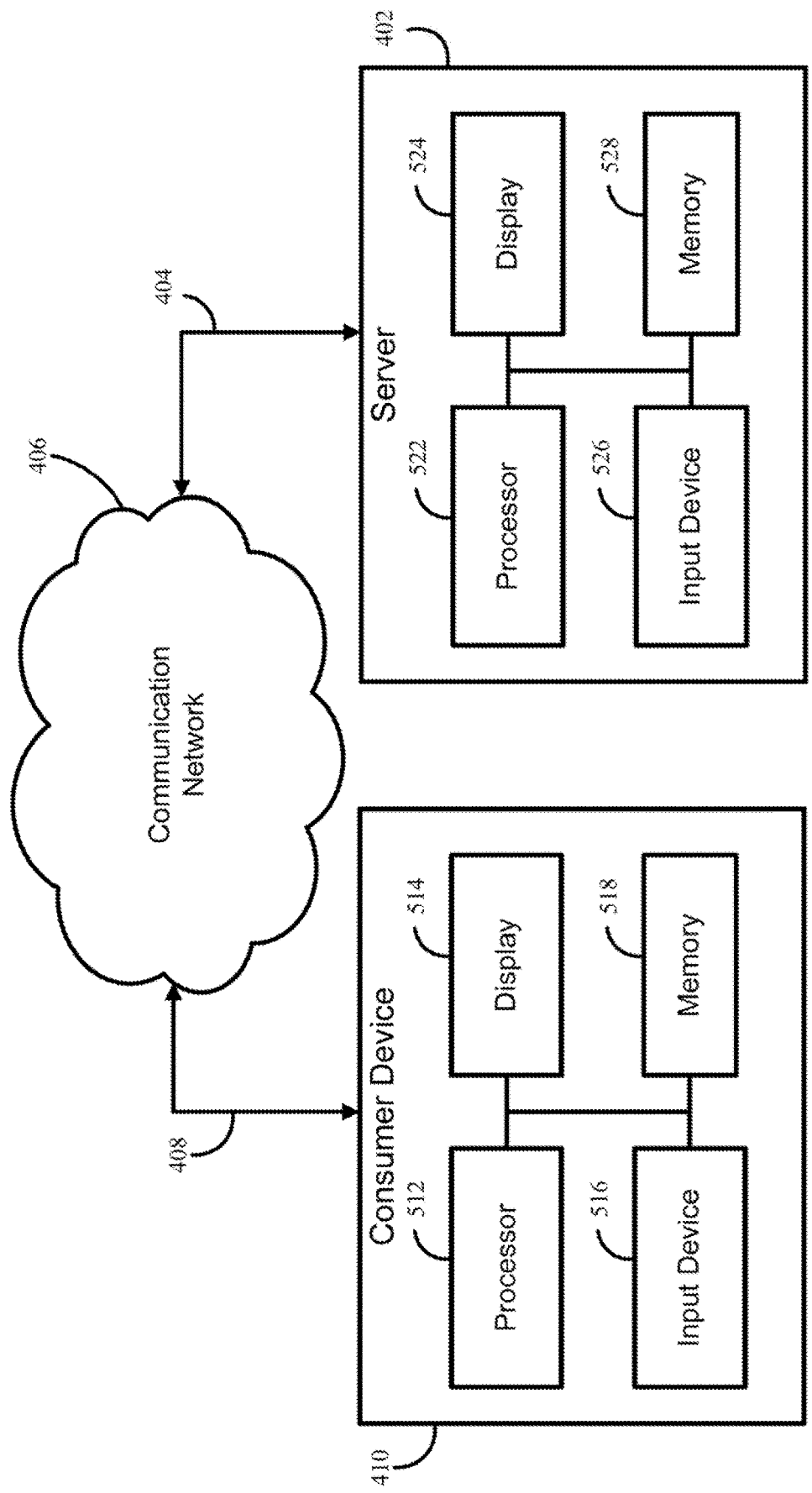
FIG. 5 shows a detailed example of a server and one of the consumer devices of FIG. 4 that can be used in accordance with some embodiments of the disclosed subject matter.

FIG. 5 illustrates an example of hardware 400 where the server and one of the consumer devices depicted in FIG. 4 are illustrated in more detail. Referring to FIG. 5, consumer device 410 can include a processor 512, a display 514, an input device 516, and memory 518, which can be interconnected. In some embodiments, memory 518 can include a storage device (such as a computer-readable medium) for storing a computer program for controlling processor 512.

Processor 512 can use the computer program to present on display 514 a browser window that loads a web page with an advertisement and/or other data received through communications link 408 and commands and values transmitted by a user of consumer device 410. It should also be noted that data received through communications link 408 or any other communications links can be received from any suitable source. Display 514 can be a flat panel display, a cathode ray tube display, a projector, a touch screen, a speaker(s), and/or any other suitable display and/or presentation devices. Input device 516 can be a computer keyboard, a computer mouse, a microphone, a touchpad, a voice recognition circuit, a touchscreen, and/or any other suitable input device.

Server 402 can include processor 522, display 524, input device 526, and memory 528, which can be interconnected. In some embodiments, memory 528 can include a storage device for storing data received through communications link 404 or through other links, and also receives commands and values transmitted by one or more users. The storage device can further include a server program for controlling processor 522.

Hardware processor 522 can use the server program to communicate with consumer devices 410, as well as provide access to and/or copies of the mechanisms described herein. It should also be noted that data received through communications link 404 or any other communications links can be received from any suitable source. In some embodiments, hardware processor 522 can send and receive data through communications link 404 or any other communication links using, for example, a transmitter, receiver, transmitter/receiver, transceiver, or any other suitable communication device. In some embodiments, hardware processor 522 can receive commands and/or values transmitted by one or more users and/or consumer devices 410. Display 524 can be a flat panel display, a cathode ray tube display, a projector, a touch screen, a speaker(s), and/or any other suitable display and/or presentation devices. Input device 526 can be a computer keyboard, a computer mouse, a microphone, a touchpad, a voice recognition circuit, a touchscreen, and/or any other suitable input device.

In some embodiments, server 402 can be implemented in one server or can be distributed as any suitable number of servers. For example, multiple servers 402 can be implemented in various locations to increase reliability and/or increase the speed at which the server can communicate with computing devices 410. As another example, multiple servers 402 can be implemented for performing various tasks, such as one server (or set of servers) can receive reports from monitoring code (e.g., whether an advertisement was viewable, identifying information of a consumer device that loaded the advertisement, the time that an advertisement was loaded and unloaded, etc.), another server (or set of servers) can store information regarding how many campaign advertisements have been viewed by particular users, and yet another server (or set of servers) can provide access to monitoring code to be loaded with advertisements.

In one particular embodiment, the mechanisms described herein can include server-side software, server-side hardware, client-side software, client-side hardware, or any suitable combination thereof. For example, the mechanisms described herein can encompass a computer program written in a programming language recognizable by server 402 and/or by consumer device 410 (e.g., a program written in a programming language, such as, Java, C, Objective-C, C++, C#, Javascript, Visual Basic, or any other suitable approaches). As another example, the mechanisms described herein can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

Accordingly, methods, systems, and media for identifying automatically refreshed advertisements are provided.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the process of FIG. 1 can be executed or performed in any order or sequence not limited to the order and sequence shown and described in the figures. Also, some of the above steps of the processes of FIG. 1 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention. Features of the disclosed implementations can be combined and rearranged in various ways.

What is claimed is:

1. A method for modifying content spending, the method comprising:
   receiving, using a hardware processor, content delivery information associated with a plurality of content items displayed on a web page;
   generating, using the hardware processor, a distribution of an amount of time that the plurality of content items were displayed on the web page using the content delivery information, wherein a continuous probability distribution is fitted to the generated distribution;
   automatically identifying, without user intervention, using the hardware processor, a statistically significant deviation within the generated distribution;
   determining, using the hardware processor, whether the statistically significant deviation correlates to an automatic refresh command performed by one or more of the browser applications by monitoring the content delivery information following the statistically significant deviation;
   determining, using the hardware processor, whether a number of views correlated with the automatic refresh command is greater than an auto-refresh threshold value; and
   inhibiting, using the hardware processor, one or more of the plurality of content items from being presented on the web page in response to determining that the number of views correlated with the automatic refresh command is greater than the auto-refresh threshold value.

2. The method of claim 1, wherein the content delivery information is received from monitoring code that tracks advertisement delivery and that is loaded on browser applications executing on a plurality of client devices on which the plurality of content items were presented.

3. The method of claim 1, wherein the statistically significant deviations indicates a sharp increase in the number of views of the plurality of content items displayed on the web page and wherein a portion of the sharp increase of the statistically significant deviation is determined to correlate to the automatic refresh command.

4. The method of claim 1, further comprising:
   presenting an interface for receiving (i) the web page on which the plurality of content items associated with an content provider device are to be displayed and (ii) a content budget designated for displaying the plurality of content item on the web page; and
   receiving information identifying the web page and the content budget via the interface.

5. The method of claim 1, wherein the content delivery information includes a content load time and a content unload time.

6. The method of claim 1, wherein generating the distribution further comprises:
   calculating content display data based on the content delivery information; and
   fitting a Weibull distribution to content display data associated with the web page.

7. The method of claim 1, further comprising extracting pattern features from the generated distribution.

8. The method of claim 7, further comprising determining whether at least one of the extracted pattern features is a sharp peak in the number of content items that were displayed on the web page over a short duration.

9. The method of claim 8, further comprising determining whether the sharp peak is followed by a significantly smaller number of content items that were displayed on the web page over a longer duration.

10. The method of claim 8, further comprising determining that a first portion of the sharp peak corresponds to the automatic refresh command and a second portion of the sharp peak corresponds to user commands to the one or more browser applications.

11. A system for modifying content spending, the system comprising:
a hardware processor that is configured to:
receive content delivery information associated with a plurality of content items displayed on a web page;
generate a distribution of an amount of time that the plurality of content items were displayed on the web page using the content delivery information, wherein a continuous probability distribution is fitted to the generated distribution;
automatically identify, without user intervention, a statistically significant deviation within the generated distribution;
determine whether the statistically significant deviation correlates to an automatic refresh command performed by one or more of the browser applications by monitoring the content delivery information following the statistically significant deviation;
determine whether a number of views correlated with the automatic refresh command is greater than an auto-refresh threshold value; and
inhibit one or more of the plurality of content items from being presented on the web page in response to determining that the number of views correlated with the automatic refresh command is greater than the auto-refresh threshold value.

12. The system of claim 11, wherein the content delivery information is received from monitoring code that tracks advertisement delivery and that is loaded on browser applications executing on a plurality of client devices on which the plurality of content items were presented.

13. The system of claim 11, wherein the statistically significant deviations indicates a sharp increase in the number of views of the plurality of content items displayed on the web page and wherein a portion of the sharp increase of the statistically significant deviation is determined to correlate to the automatic refresh command.

14. The system of claim 11, wherein the hardware processor is further configured to:
present an interface for receiving (i) the web page on which the plurality of content items associated with an content provider device are to be displayed and (ii) a content budget designated for displaying the plurality of content item on the web page; and
receive information identifying the web page and the content budget via the interface.

15. The system of claim 11, wherein the content delivery information includes a content load time and a content unload time.

16. The system of claim 11, wherein generating the distribution further comprises:
calculating content display data based on the content delivery information; and
fitting a Weibull distribution to content display data associated with the web page.

17. The system of claim 11, wherein the hardware processor is further configured to extract pattern features from the generated distribution.

18. The system of claim 17, wherein the hardware processor is further configured to determine whether at least one of the extracted pattern features is a sharp peak in the number of content items that were displayed on the web page over a short duration.

19. The system of claim 18, wherein the hardware processor is further configured to determine whether the sharp peak is followed by a significantly smaller number of content items that were displayed on the web page over a longer duration.

20. The system of claim 18, wherein the hardware processor is further configured to determine that a first portion of the sharp peak corresponds to the automatic refresh command and a second portion of the sharp peak corresponds to user commands to the one or more browser applications.

21. A non-transitory computer-readable medium containing computer-executable instructions that, when executed by a processor, cause the processor to perform a method for content spending, the method comprising:
receiving content delivery information associated with a plurality of content items displayed on a web page;
generating a distribution of an amount of time that the plurality of content items were displayed on the web page using the content delivery information, wherein a continuous probability distribution is fitted to the generated distribution;
automatically identifying, without user intervention, a statistically significant deviation within the generated distribution;
determining whether the statistically significant deviation correlates to an automatic refresh command performed by one or more of the browser applications by monitoring the content delivery information following the statistically significant deviation;
determining whether a number of views correlated with the automatic refresh command is greater than an auto-refresh threshold value; and
inhibiting one or more of the plurality of content items from being presented on the web page in response to determining that the number of views correlated with the automatic refresh command is greater than the auto-refresh threshold value.

* * * * *